(12) United States Patent
Searl et al.

(10) Patent No.: US 11,257,090 B2
(45) Date of Patent: Feb. 22, 2022

(54) MESSAGE PROCESSING PLATFORM FOR AUTOMATED PHISH DETECTION

(71) Applicant: Bank of America Corporation, Charlotte, NC (US)

(72) Inventors: Cody Searl, Pineville, NC (US); Keaton Drake, Charlotte, NC (US); Stephen C. Brown, Charlotte, NC (US); Christopher D. Birch, Tega Cay, SC (US); George Albero, Charlotte, NC (US)

(73) Assignee: Bank of America Corporation, Charlotte, NC (US)

( * ) Notice: Subject to any disclaimer, the term of this patent is extended or adjusted under 35 U.S.C. 154(b) by 108 days.

(21) Appl. No.: 16/795,975

(22) Filed: Feb. 20, 2020

(65) Prior Publication Data
US 2021/0264430 A1 Aug. 26, 2021

(51) Int. Cl.
*G06Q 40/00* (2012.01)
*G06Q 20/40* (2012.01)
(Continued)

(52) U.S. Cl.
CPC ......... *G06Q 20/4016* (2013.01); *G06N 20/00* (2019.01); *G06Q 20/3223* (2013.01); *H04L 63/1483* (2013.01)

(58) Field of Classification Search
CPC ........... G06Q 20/4016; G06Q 20/3223; G06N 20/00; H04L 63/1483
See application file for complete search history.

(56) References Cited

U.S. PATENT DOCUMENTS 8,041,592 B2 10/2011 Lopez
8,402,003 B2 3/2013 Biran et al.
(Continued)

FOREIGN PATENT DOCUMENTS

WO WO 2001077959 * 10/2001 ............. G06Q 20/00
WO WO-0207058 A1 * 1/2002 ......... G06Q 30/0619

OTHER PUBLICATIONS

Gupta et al., "Defending against Phishing Attacks: Taxonomy of Methods, Current Issues and Future Directions," Cornel University, arXir.org, May 2017 (Year: 2017).*
(Continued)

*Primary Examiner* — Alexander G Kalinowski
*Assistant Examiner* — William B. Bunker
(74) *Attorney, Agent, or Firm* — Banner & Witcoff, Ltd.

(57) ABSTRACT

Aspects of the disclosure relate to a message processing platform for enhanced phishing message detection. A computing platform may receive a first message from a first source entity, where the first message was flagged as potentially malicious through selection of a malicious message button in a mobile banking application, and where the first message includes content from the first source entity pretending to be a second source entity different than the first source entity. Using one or more machine learning algorithms, the computing platform may parse the first message to identify the second source entity. The computing platform may identify an enterprise security system associated with the second source entity, and may generate a second message that includes the first message as an attachment and indicates that the first message was flagged as potentially malicious. Subsequently, the computing platform may send, to the enterprise security system, the second message.

20 Claims, 13 Drawing Sheets

305

Customer Engagement

Thank you for flagging a phishing message. You've unlocked a 5% cash back bonus at "Restaurant #1." Please continue to help us!

(51) Int. Cl.
  *H04L 29/06* (2006.01)
  *G06N 20/00* (2019.01)
  *G06Q 20/32* (2012.01)

(56) References Cited

U.S. PATENT DOCUMENTS

| | | | |
|---|---|---|---|
| 8,528,091 B2 | 9/2013 | Bowen et al. | |
| 8,839,401 B2 | 9/2014 | Starink et al. | |
| 9,105,000 B1 | 8/2015 | White et al. | |
| 9,178,901 B2 | 11/2015 | Xue et al. | |
| 9,241,009 B1 | 1/2016 | Starink et al. | |
| 9,367,872 B1 | 6/2016 | Visbal et al. | |
| 9,548,988 B1 | 1/2017 | Roundy et al. | |
| 9,674,221 B1 | 6/2017 | Higbee et al. | |
| 9,686,297 B2 | 6/2017 | Starink et al. | |
| 9,760,838 B1 | 9/2017 | Danson et al. | |
| 9,811,683 B2 | 11/2017 | Adams et al. | |
| 9,838,407 B1 | 12/2017 | Oprea et al. | |
| 10,050,998 B1 * | 8/2018 | Singh | H04L 63/145 |
| 10,187,407 B1 | 1/2019 | Higbee et al. | |
| 10,326,791 B2 | 6/2019 | Starink et al. | |
| 10,356,032 B2 * | 7/2019 | White | G06Q 10/10 |
| 10,425,444 B2 | 9/2019 | Elworthy | |
| 10,530,806 B2 | 1/2020 | Starink et al. | |
| 10,601,865 B1 * | 3/2020 | Mesdaq | H04L 51/12 |
| 10,937,035 B1 * | 3/2021 | Merritt | G06Q 30/0185 |
| 11,025,651 B2 * | 6/2021 | AlGarawi | H04L 51/12 |
| 2009/0287599 A1 * | 11/2009 | Lamar, III | G06Q 20/42 705/39 |
| 2011/0090080 A1 * | 4/2011 | Yu | G06Q 30/0201 340/539.13 |
| 2013/0144813 A1 * | 6/2013 | Sengupta | G06N 20/00 706/12 |
| 2013/0275308 A1 * | 10/2013 | Paraskeva | G06Q 20/02 705/71 |
| 2016/0063500 A1 * | 3/2016 | Sherlock | G06Q 20/40 705/44 |
| 2016/0344758 A1 * | 11/2016 | Cohen | G08B 21/18 |
| 2017/0178249 A1 * | 6/2017 | Pigoski, II | G06Q 50/265 |
| 2018/0091453 A1 * | 3/2018 | Jakobsson | H04L 51/12 |
| 2018/0191754 A1 * | 7/2018 | Higbee | G06F 21/554 |
| 2019/0026461 A1 | 1/2019 | Cidon et al. | |
| 2020/0036751 A1 * | 1/2020 | Kohavi | H04L 63/1425 |
| 2020/0358799 A1 * | 11/2020 | Boyer | H04L 63/101 |
| 2020/0387994 A1 * | 12/2020 | Roller | G06K 9/00892 |
| 2020/0396237 A1 * | 12/2020 | Cohen | H04L 63/1425 |

OTHER PUBLICATIONS

Yuan et al., "Detecting Phishing Websites and Targets Based on URL's and Webpage Links," 2018 24th International Conference on Pattern Recognition (ICPR), Aug. 2018 (Year: 2018).*

* cited by examiner

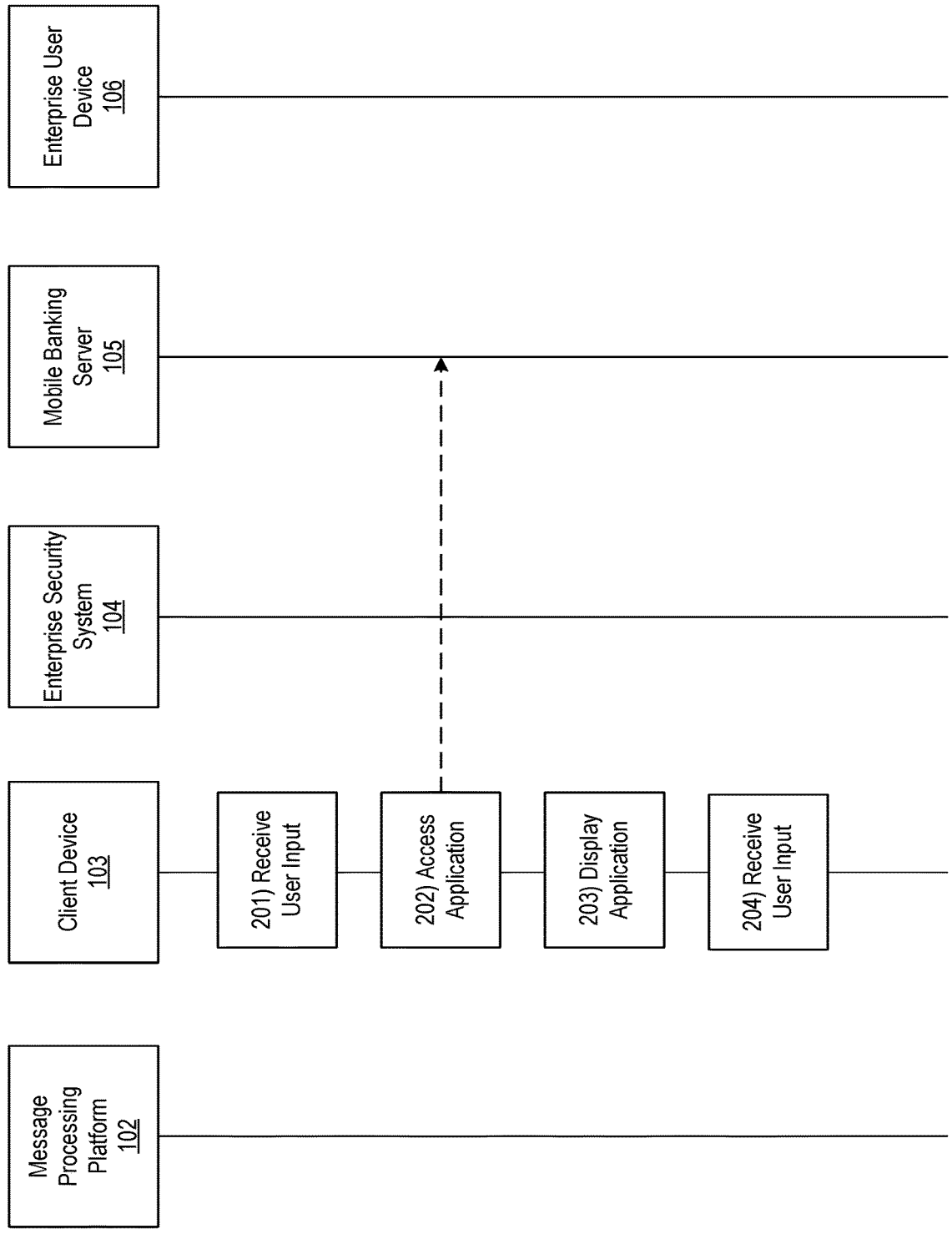

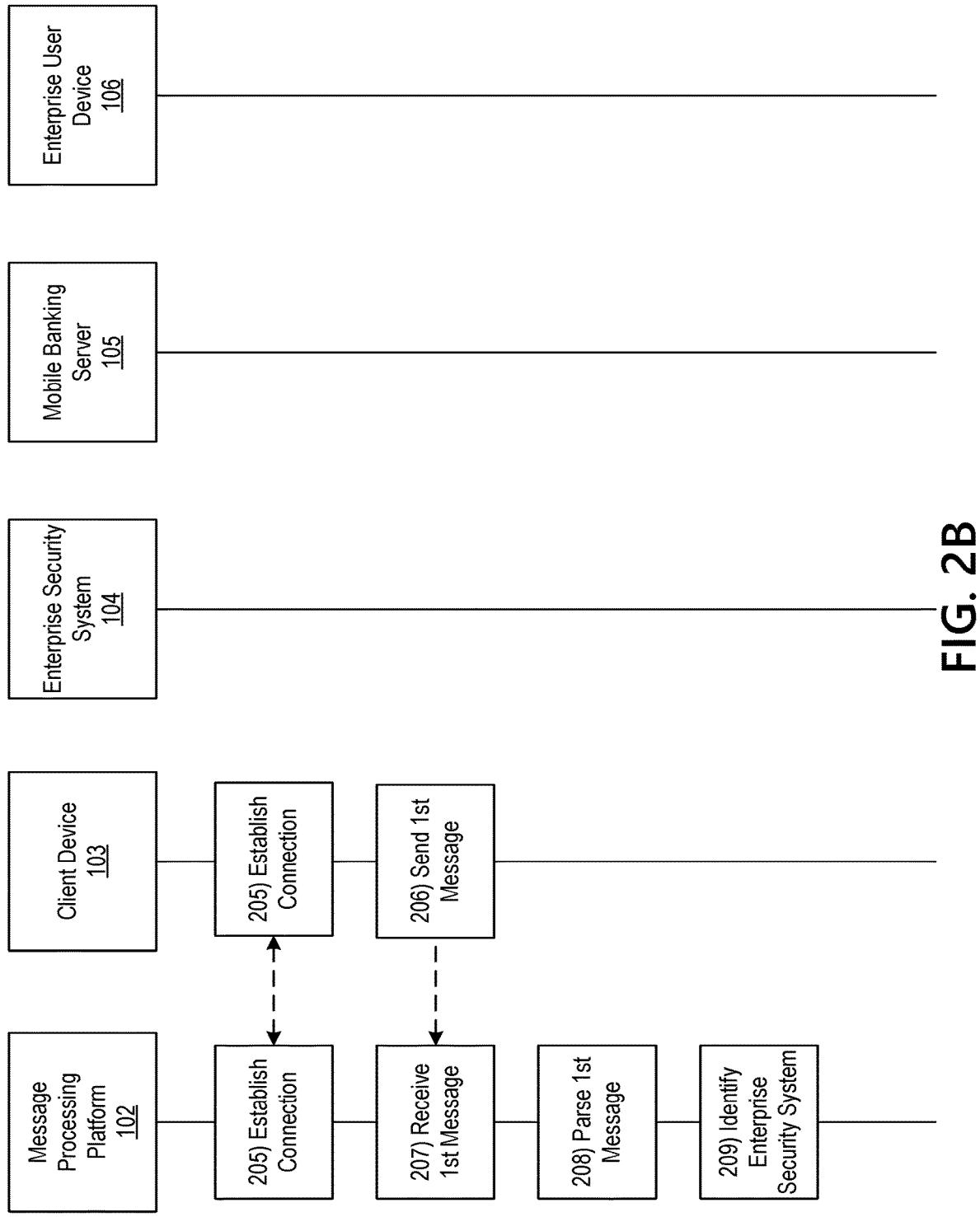

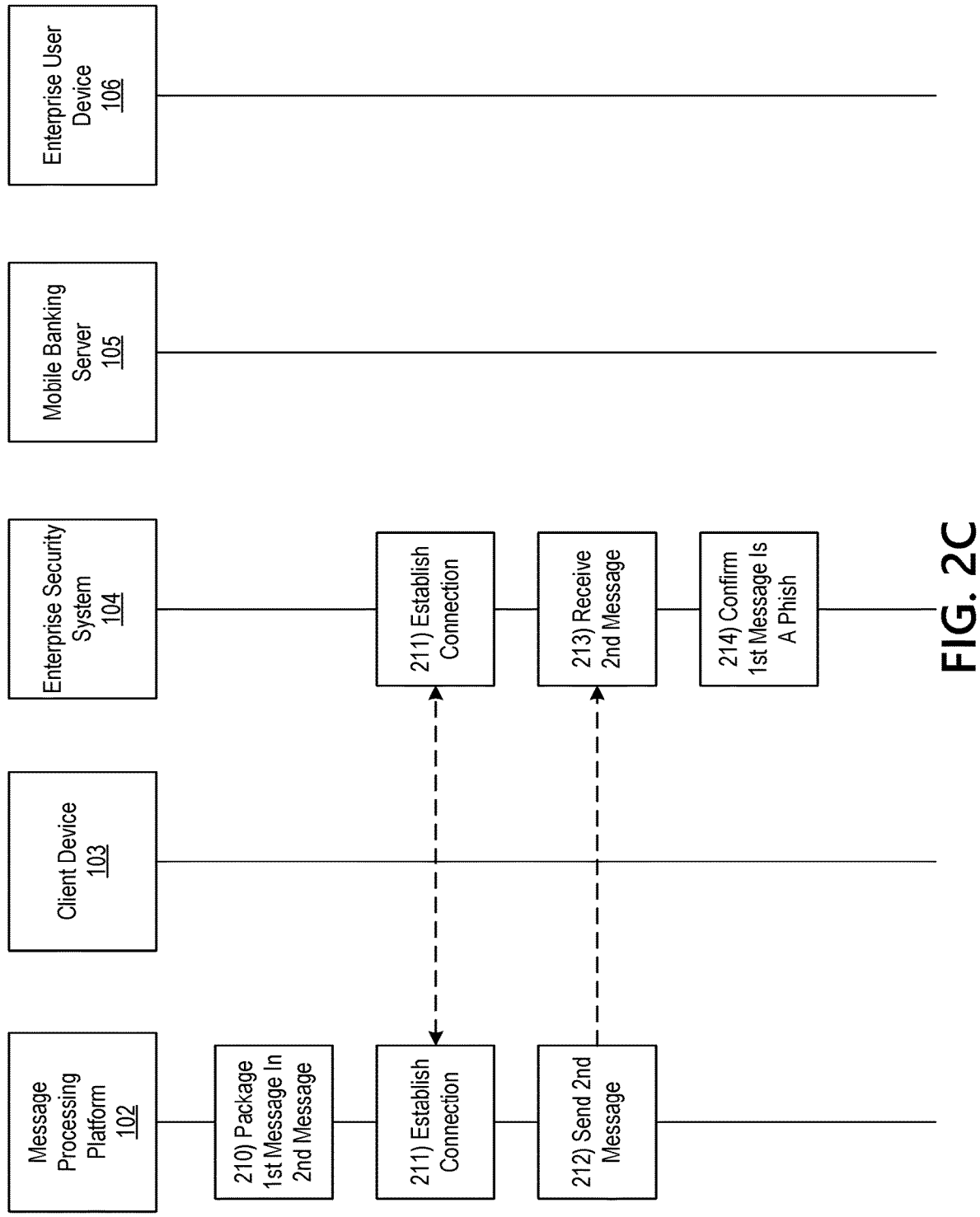

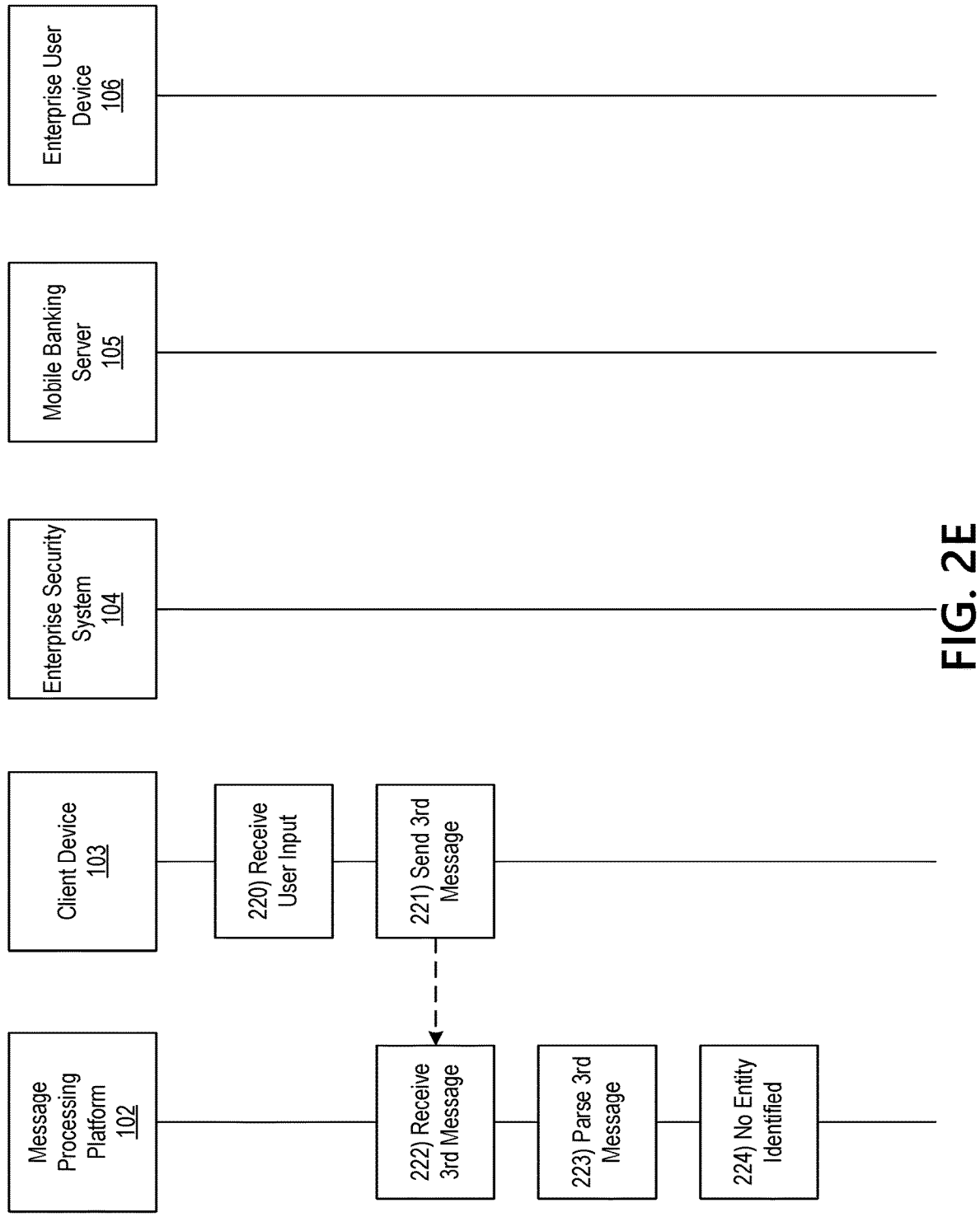

305

Customer Engagement

Thank you for flagging a phishing message. You've unlocked a 5% cash back bonus at "Restaurant #1." Please continue to help us!

Manual Review Interface

We are unable to automatically identify an intended sender for the message below. Please see the sender address, and provide your input below:

Sender: person#1@ENTERPR1SEORGANIZATION.com

Intended Sender: ☐

Customer Engagement

Thank you for participating in the phish identification program. Unfortunately you identified a legitimate message! Please continue to monitor messages going forward.

FIG. 5

MESSAGE PROCESSING PLATFORM FOR AUTOMATED PHISH DETECTION

BACKGROUND

Aspects of the disclosure relate to detecting malicious messages, such as phishing messages. In particular, one or more aspects of the disclosure relate to computing platforms that implement message processing techniques to preserve message data.

In some cases, individuals may receive messages from a first source entity pretending to be a second source entity. These messages are often referred to as phishing messages, as they typically try to lure unsuspecting recipients into entering login credentials, financial details, and/or other personal information into malicious websites that appear very similar to legitimate websites. In some instances, enterprise organizations may maintain services to which possible phishing messages may be forwarded for analysis. In some instances, however, data associated with such possible phishing messages may be lost as the messages are forwarded for analysis. As a result, it may be difficult for enterprise organizations to accurately distinguish between phishing messages and legitimate messages.

SUMMARY

Aspects of the disclosure provide effective, efficient, scalable, and convenient technical solutions that address and overcome the technical problems associated with identifying and processing of phishing messages. For example, some aspects of the disclosure provide techniques that may enable computing devices to include header information, metadata, or the like, associated with an identified message, in a reporting message that flags the identified message as a potential phishing message. In doing so, various technical advantages may be realized. For example, if an identified message is merely forwarded to another computing platform for further analysis, header information, metadata, or the like, may be lost, and thus the other computing platform might not be able to use such information in its analysis of the message. This may result in less accurate phish analysis. If such header information, metadata, or the like is available for analysis, however, accuracy of phish identification by computing platforms may increase.

In accordance with one or more embodiments of the disclosure, a computing platform comprising at least one processor, a communication interface, and memory storing computer-readable instructions may receive a first message from a first source entity, where the first message was flagged as potentially malicious through selection of a malicious message button in a mobile banking application, and where the first message includes content from the first source entity pretending to be a second source entity different than the first source entity. Using one or more machine learning algorithms, the computing platform may parse the first message to identify the second source entity. The computing platform may identify an enterprise security system associated with the second source entity. The computing platform may generate a second message that includes the first message as an attachment and indicates that the first message was flagged as potentially malicious. The computing platform may send, to the enterprise security system, the second message.

In one or more instances, the computing platform may include the first message as an attachment to the second message by generating a data object containing data from the first message and embedding the data object in the second message. In one or more instances, the computing platform may generate a client engagement message indicating a reward. The computing platform may send, to a client device, the client engagement message, where the first message was flagged as potentially malicious at the client device.

In one or more instances, the reward may be identified based on transaction data associated with an account through which the first message was flagged as potentially malicious within the mobile banking application. In one or more instances, the computing platform may maintain a dynamic table comprising correlations between source entities and enterprise security systems. In these instances, the computing platform may identify the enterprise security system associated with the second source entity using the dynamic table and based on a correlation between the enterprise security system and the second source entity.

In one or more instances, the mobile banking application may be configured to communicate with a mail application through an application programming interface. In one or more instances, the computing platform may include the first message as an attachment to the second message by: 1) extracting header information from the first message, 2) generating a text file that includes the header information from the first message, and 3) attaching, to the second message, the text file that includes the header information from the first message.

In one or more instances, the computing platform may receive a third message from the first source entity, where the third message was flagged as potentially malicious through selection of the malicious message button in the mobile banking application, and where the third message includes content from the first source entity pretending to be the second source entity. Using one or more machine learning algorithms, the computing platform may parse the third message, which might not result in identification of the second source entity. The computing platform may generate one or more commands directing an enterprise user device to display a user interface requesting user input identifying the second source entity. In response to the one or more commands directing an enterprise user device to display a user interface requesting user input identifying the second source entity, the computing platform may receive a message identifying the second source entity. The computing platform may generate a fourth message, which may include the third message as an attachment and indicate that third first message was flagged as potentially malicious. The computing platform may send, to the enterprise security system, the fourth message. In one or more instances, the computing platform may parse the first message to identify the second source entity using one or more of: template comparison or artificial intelligence algorithms to identify the second source entity.

These features, along with many others, are discussed in greater detail below.

BRIEF DESCRIPTION OF THE DRAWINGS

The present disclosure is illustrated by way of example and not limited in the accompanying figures in which like reference numerals indicate similar elements and in which:

FIGS. 2A-2H depict an illustrative event sequence for implementing a message processing platform for enhanced phishing message detection in accordance with one or more example embodiments;

FIGS. 3-5 depict illustrative user interfaces for implementing a message processing platform for enhanced phishing message detection in accordance with one or more example embodiments.

DETAILED DESCRIPTION

In the following description of various illustrative embodiments, reference is made to the accompanying drawings, which form a part hereof, and in which is shown, by way of illustration, various embodiments in which aspects of the disclosure may be practiced. In some instances, other embodiments may be utilized, and structural and functional modifications may be made, without departing from the scope of the present disclosure.

It is noted that various connections between elements are discussed in the following description. It is noted that these connections are general and, unless specified otherwise, may be direct or indirect, wired or wireless, and that the specification is not intended to be limiting in this respect.

As a brief introduction to the concepts described further herein, one or more aspects of the disclosure provide systems and methods to efficiently and effectively flag messages as phishing messages and communicate details of the potential phishing messages to assist in further message analysis. For example, when a user receives a phishing email, the user typically forwards the email for further analysis. When an email is merely forwarded, however, as opposed to being sent as an independent attachment, important header information and/or metadata is lost, especially if the email is forwarded to an external inbox (e.g., an inbox outside of an enterprise organization maintaining a network on which the user is accessing emails). Accordingly, one solution to this problem, which is provided by one or more aspects of the disclosure, is a third party application that may link into a desktop application and allow the user to forward the email as an attachment. Another solution is a malicious message feature in the enterprise's mobile application. For example, the user may log into the application, and an application programming interface (API) for that provider may open up and allow the user to identify the phishing email. As yet another solution, an extension feature may be integrated into an email system itself. For example, a mail application may have an extension that, when a malicious message is identified, sends the email as an attachment for further analysis. As yet another solution, an email engine may forward all emails identified as spam to the enterprise organization. In this example, the enterprise organization may then filter the spam emails for malicious emails. In one or more of these proposed solutions, a reward may be offered to the user for forwarding the phishing email.

Accordingly, by performing the one or more methods described herein, one or more of the systems described herein may implement effective methods for identifying phishing messages. For example, by including the message and/or details of the message as an attachment, rather than merely forwarding the message, header information, metadata, and/or other important information may be preserved that may be used to identify the message as a phish.

Figure 1A:
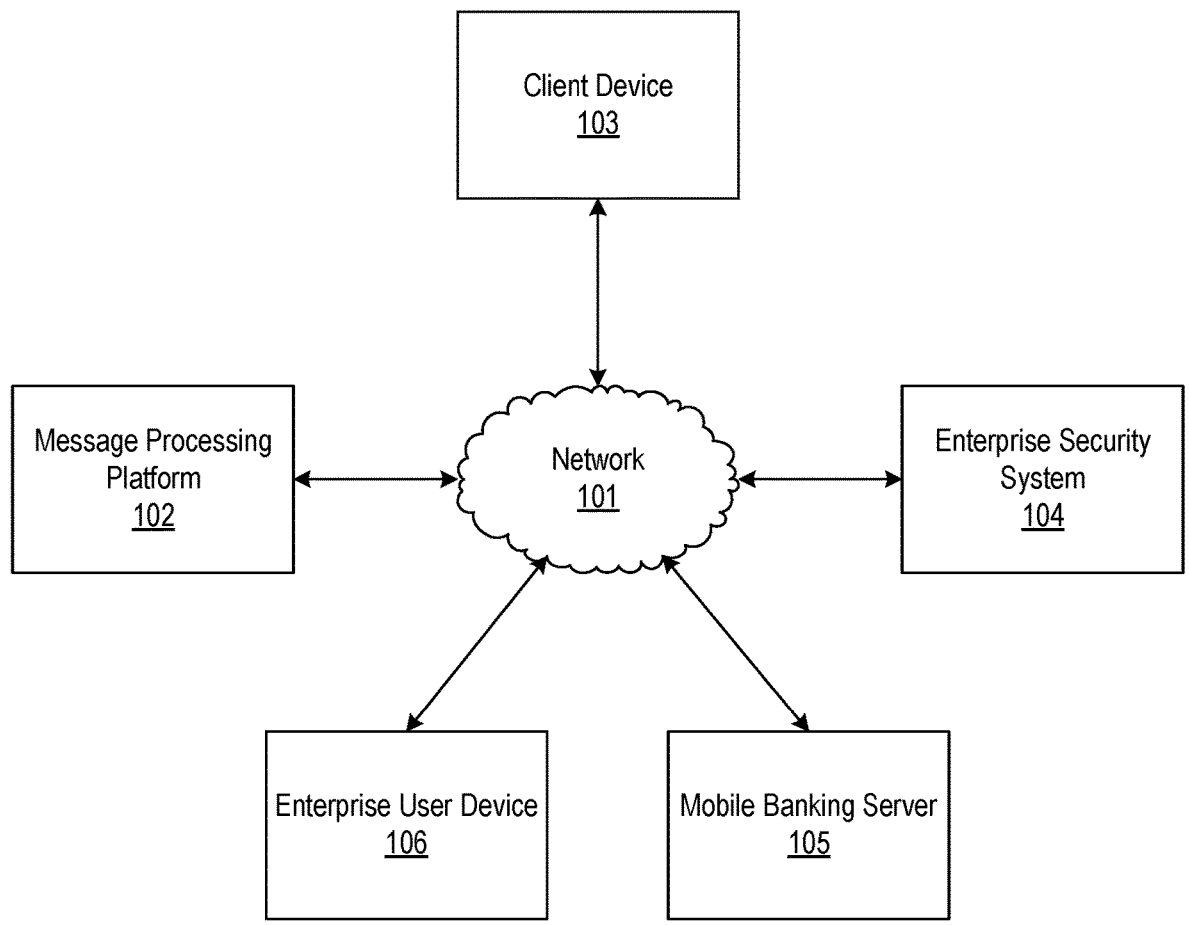
FIGS. 1A-1B depict an illustrative computing environment for implementing a message processing platform for enhanced phishing message detection in accordance with one or more example embodiments.
Figure 1B:
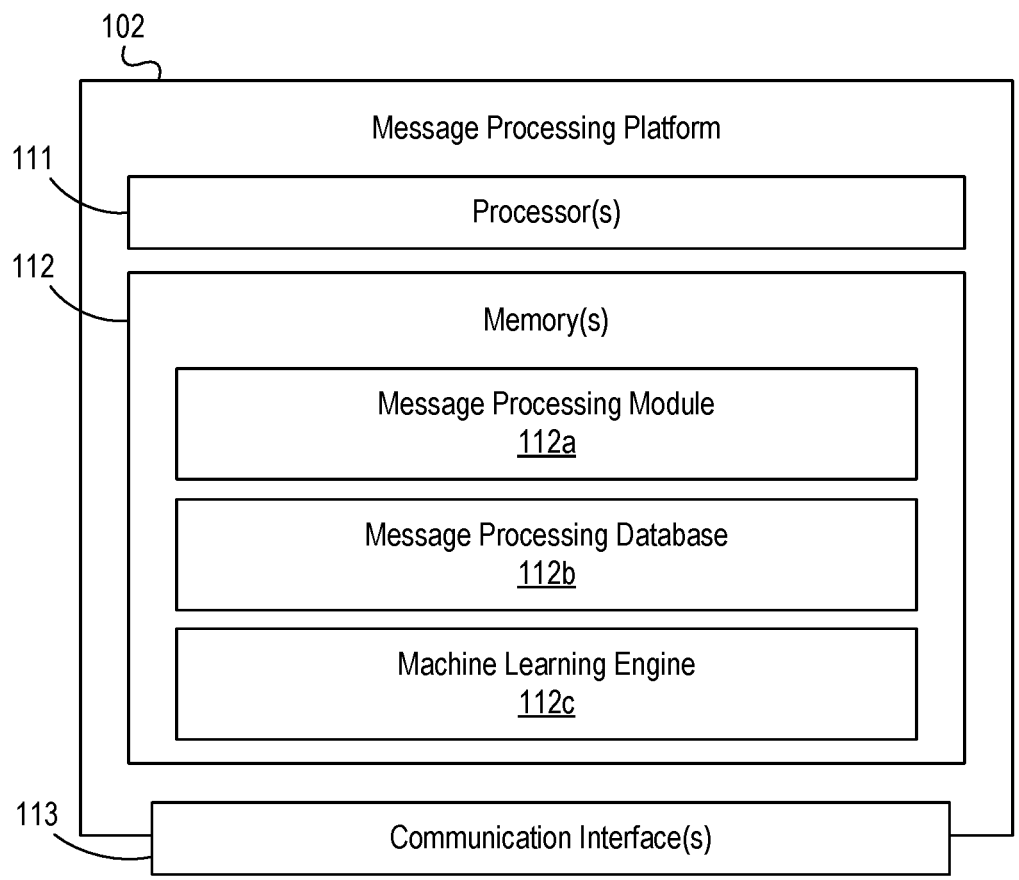

FIGS. 1A-1B depict an illustrative computing environment that implements a message processing platform for enhanced phishing message detection in accordance with one or more example embodiments. Referring to FIG. 1A, computing environment 100 may include one or more computer systems. For example, computing environment 100 may include a message processing platform 102, a client device 103, an enterprise security system 104, a mobile banking server 105, and an enterprise user device 106.

As described further below, message processing platform 102 may be a computer system that includes one or more computing devices (e.g., servers, server blades, or the like) and/or other computer components (e.g., processors, memories, communication interfaces) that may be used to parse and package message information, which may be extracted from and/or otherwise associated with messages flagged as potential phishing messages, for further analysis. In some instances, message processing platform 102 may be configured to identify entities associated with the phishing message, and to notify them of the phish identification. In some instances, the message processing platform 102 may be maintained by an enterprise organization (e.g., a financial institution, or the like). In some instances, message processing platform 102 may be configured to maintain a dynamic table that stores correlations between enterprise organizations and associated enterprise security systems (e.g., enterprise security system 104, or the like).

Client device 103 may be a desktop computer, laptop computer, tablet, mobile device, or the like, and may be used by an individual such as a customer of an enterprise organization (e.g., a financial institution, or the like). For example, client device 103 may be configured to cause display of and/or otherwise present one or more graphical user interfaces (e.g., interfaces associated with a mobile banking application, electronic messaging application, or the like). In some instances, the client device 103 may be configured to receive, through one or the graphical user interfaces, a user input (e.g., from a client of the financial institution) indicating that a message may be a phishing message.

Enterprise security system 104 may be a server, desktop computer, laptop computer, tablet, mobile device, or the like, that is associated with an enterprise organization, and is configured to confirm or deny whether the message flagged as a phishing message is actually a phishing message. For example, the enterprise security system 104 may compare the flagged phishing message against internal records, route the flagged phishing message for manual review, or the like. In some instances, the enterprise security system 104 may be configured to generate one or more customer engagement messages, which may, in some instances, offer a reward to a user of the client device 103 for accurately identifying a phishing message.

Mobile banking server 105 may be a computer system that includes one or more computing devices (e.g., servers, server blades, or the like) and/or other computer components (e.g., processors, memories, communication interfaces) that may be used to host information associated with a mobile banking application, electronic messaging service, or the like. For example, mobile banking server 105 may be configured to communicate with the client device 103 to facilitate display of graphical user interfaces associated with the mobile banking application, electronic messaging service, or the like.

Enterprise user device 106 may be a desktop computer, laptop computer, tablet, mobile device, or the like, and may be used by an individual such as an employee of an enterprise organization (e.g., a financial institution, or the like). In some instances, the enterprise user device 106 may be used by an employee of the same enterprise organization that is associated with message processing platform 102. For example the enterprise user device 106 may be configured to cause display of and/or otherwise present one or more graphical user interfaces (e.g., interfaces that allow the employee of the enterprise organization to perform a manual analysis of the flagged phishing messages and to provide user input indicating whether or not the message was accurately flagged as a phish, or the like).

Computing environment 100 also may include one or more networks, which may interconnect message processing platform 102, client device 103, enterprise security system 104, mobile banking server 105, enterprise user device 106, or the like. For example, computing environment 100 may include a network 101 (which may interconnect, e.g., message processing platform 102, client device 103, enterprise security system 104, mobile banking server 105, and enterprise user device 106).

In one or more arrangements, message processing platform 102, client device 103, enterprise security system 104, mobile banking server 105, and enterprise user device 106 may be any type of computing device capable of sending and/or receiving requests and processing the requests accordingly. For example, message processing platform 102, client device 103, enterprise security system 104, mobile banking server 105, enterprise user device 106, and/or the other systems included in computing environment 100 may, in some instances, be and/or include server computers, desktop computers, laptop computers, tablet computers, smart phones, or the like that may include one or more processors, memories, communication interfaces, storage devices, and/or other components. As noted above, and as illustrated in greater detail below, any and/or all of message processing platform 102, client device 103, enterprise security system 104, mobile banking server 105, and enterprise user device 106 may, in some instances, be special-purpose computing devices configured to perform specific functions.

Referring to FIG. 1B, message processing platform 102 may include one or more processors 111, memory 112, and communication interface 113. A data bus may interconnect processor 111, memory 112, and communication interface 113. Communication interface 113 may be a network interface configured to support communication between message processing platform 102 and one or more networks (e.g., network 101, or the like). Memory 112 may include one or more program modules having instructions that when executed by processor 111 cause message processing platform 102 to perform one or more functions described herein and/or one or more databases that may store and/or otherwise maintain information which may be used by such program modules and/or processor 111. In some instances, the one or more program modules and/or databases may be stored by and/or maintained in different memory units of message processing platform 102 and/or by different computing devices that may form and/or otherwise make up message processing platform 102. For example, memory 112 may have, host, store, and/or include message processing module 112a, message processing database 112b, and a machine learning engine 112c.

Message processing module 112a may have instructions that direct and/or cause message processing platform 102 to execute advanced machine learning and data extraction techniques related to phishing message identification, as discussed in greater detail below. Message processing database 112b may store information used by message processing module 112a and/or message processing platform 102 in application of machine learning techniques related to phishing message identification, and/or in performing other functions. Machine learning engine 112c may have instructions that direct and/or cause the message processing platform 102 to set, define, and/or iteratively refine optimization rules and/or other parameters used by the message processing platform 102 and/or other systems in computing environment 100.

Figure 2D:
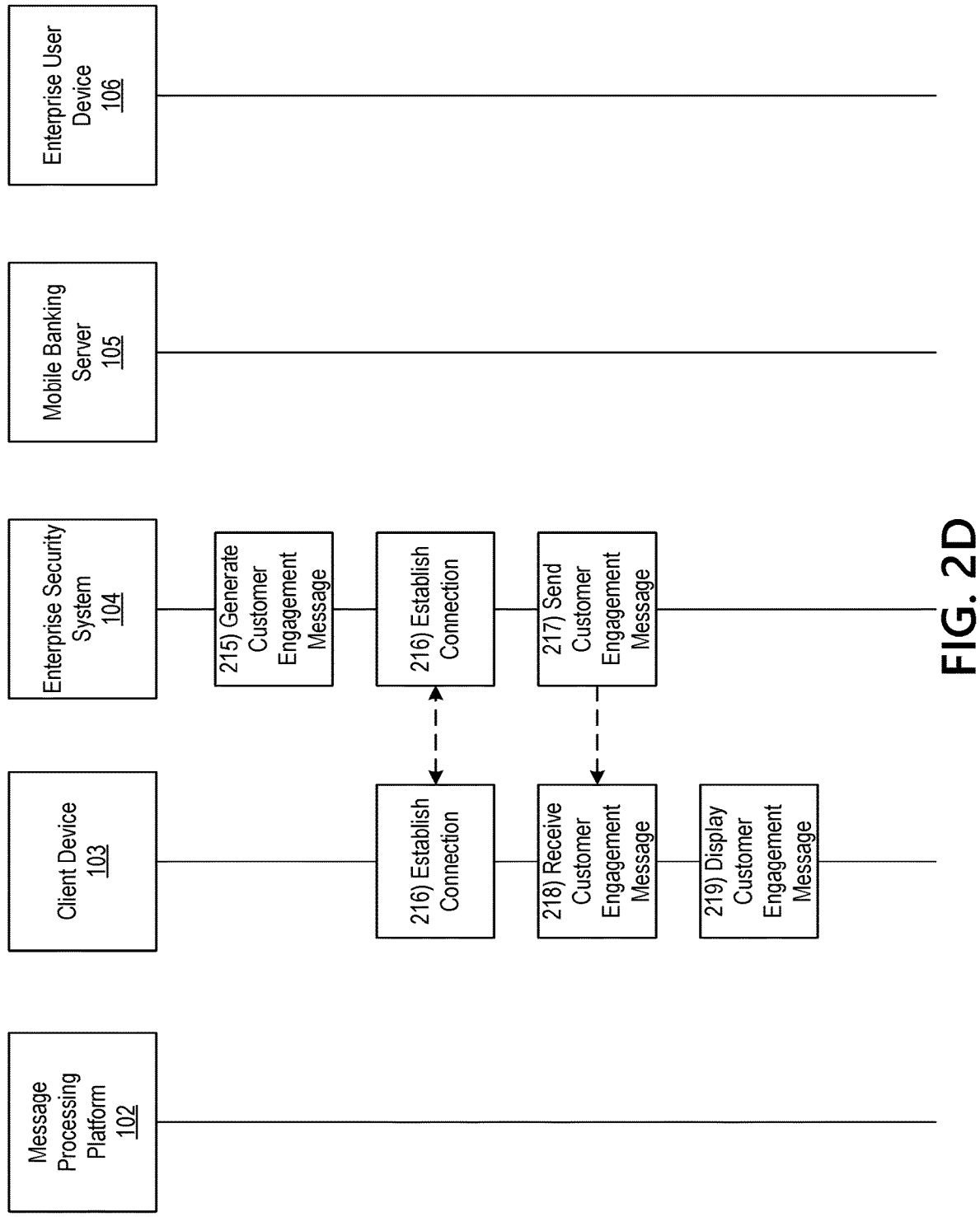

FIGS. 2A-2H depict an illustrative event sequence that implements a message processing platform for enhanced phishing message detection in accordance with one or more example embodiments. Referring to FIG. 2A, at step 201, the client device 103 may receive user input requesting access to an electronic message service (e.g., an email inbox, or the like). In some instances, in receiving the user input requesting access to the electronic message service, the client device 103 may receive user input via a mobile banking application. For example, the client device 103 may display one or more user interfaces associated with a mobile banking application, and the electronic message service may be accessible within the mobile banking application. In some instances, the client device 103 may receive the user input from, for example, a client of an enterprise organization (e.g., a financial institution associated with the mobile banking application, or the like). In some instances, in receiving the user input requesting access to the electronic message service, the client device 103 may receive user input requesting access to the mobile banking application. In some instances, the client device 103 may have previously been displaying an electronic messaging service, and may subsequently receive user input requesting access to the mobile banking application (e.g., a user may be presented with an email in the electronic messaging service, and may provide input requesting to launch the mobile banking application to report the email within the mobile banking application). In some instances, the mobile banking application and the electronic message service may be configured to communicate with each other through an application programming interface (API).

At step 202, the client device 103 may access the electronic messaging service and/or mobile banking application at the mobile banking server 105. For example, the mobile banking server 105 may store information used to generate user interfaces at the client device 103 associated with the electronic messaging service and/or the mobile banking application. In some instances, a wireless data connection may be established between the client device 103 and the mobile banking server 105, and the client device 103 may access the electronic messaging service and/or mobile banking application using the established connection.

At step 203, the client device 103 may display a user interface associated with the electronic messaging service and/or mobile banking application. For example, the client device 103 may display an electronic messaging/mobile banking interface (e.g., a user interface that includes one or more messages associated with an account of a user of the client device 103). In some instances, the client device 103 may display the electronic messaging/mobile banking interface in response to the user input received at step 201 and using the information obtained in accessing the mobile banking server at step 202.

At step 204, the client device 103 may receive user input flagging a first message as potentially malicious. For example, the client device 103 may receive user input identifying the first message as a phish. In some instances, the client device 103 may receive the user input flagging the first message as potentially malicious through a third party application. For example, the mobile banking application being displayed at the client device 103 may hook and/or otherwise integrate a third party application into the mobile banking application (e.g., display an advertisement, or other selectable method for accessing the third party application via the mobile banking application). In some instances, if the client device 103 receives a user input corresponding to selection of the third party application, the client device 103 may capture a message being simultaneously displayed along with the indication of the third party application within the mobile banking application. In these instances, the client device 103 may launch the third party application, which may include launching a new message that includes the first message as an attachment. In some instances, the client device 103 may configure the new message so that a user may provide a destination address to which the new message may be sent. In other instances, the client device 103 may automatically configure a destination address for the new message, and may send the new message without displaying the new message at the client device 103 (e.g., the user may continue to operate the electronic messaging and/or mobile banking application uninterrupted, and the client device 103 may attach the first message to the new message/populate a destination address/send the new message to the destination address automatically in the background).

Additionally or alternatively, the client device 103 may receive the user input flagging the first message as potentially malicious using a malicious message button. In some instances, flagging the first message through the malicious message button may be similar to the methods described above with regard to the third party application; however, in these instances, the malicious message button may be part of the electronic messaging and/or mobile banking application (e.g., as opposed to being hooked/integrated as an advertisement, or the like). In these instances, in response to receiving user input selecting the malicious message button, the client device 103 may attach the first message to a new message. As described above, the client device 103 may automatically populate a destination address for the new message, or may receive the destination address as a user input.

Additionally or alternatively, the client device 103 may receive the user input flagging the first message as potentially malicious using an extension feature. For example, the extension feature may be integrated into an electronic messaging and/or mobile banking application. In some instances, if the client device 103 receives a selection input corresponding to the extension feature, the client device 103 may generate a new message that includes the first message, and may send the new message to an enterprise organization associated with the electronic messaging service, an enterprise organization associated with the mobile banking application, another identified source entity (e.g., if it is detected that a first source entity is pretending to be a second source entity, the client device 103 may notify the second source entity), or the like. For example, in implementing the extension feature, both an enterprise associated with the application being accessed and a spoofed individual may be notified.

Additionally or alternatively, the client device 103 may receive the user input within the electronic messaging and/or mobile banking application itself, and the application may forward all flagged messages (e.g., including the first message). For example, the client device 103 may forward all flagged messages for further manual and/or automated analysis of the flagged messages.

It should be understood that actions described above with regard to step 204 may be performed across one or more devices. For example, the client device 103 may establish a connection with a message processing platform (e.g., message processing platform 102) to implement the third party application, malicious message button, extension feature, electronic messaging service, or the like, as is described further below.

Referring to FIG. 2B, at step 205, the client device 103 may establish a connection with message processing platform 102. For example, the client device 103 may establish a first wireless data connection with message processing platform 102 to link the client device 103 to the message processing platform 102. In some instances, the client device 103 may identify whether or not a connection is already established with the message processing platform 102. If a connection is already established with the message processing platform 102, the client device 103 might not re-establish the connection. If a connection is not already established, the client device 103 may establish the first wireless data connection as described herein.

At step 206, the client device 103 may send the first message to the message processing platform 102. In some instances, in sending the first message, the client device 103 may send the first message as an attachment to another message (e.g., the new message described above at step 205). In one or more instances, the client device 103 may send the first message to the message processing platform 102 while the first wireless data connection is still established.

At step 207, the message processing platform 102 may receive the first message, sent at step 206. In some instances, the message processing platform 102 may receive the first message via the communication interface 113 and while the first wireless data connection is established.

At step 208, the message processing platform 102 may parse the first message to identify whether or not the first message was correctly flagged as a phish. For example, the message processing platform 102 may apply one or more of: template comparison, natural language processing, artificial intelligence algorithms, machine learning algorithms, YARA rules (e.g., a rule based approach used to create descriptions of malware families based on textual and/or binary patterns), or the like, to identify whether or not the first message was correctly flagged as a phish. In parsing the first message, the message processing platform 102 may identify whether a first entity is pretending to be a second entity based on the patterns detected through the methods described above. In some instances, in parsing the first message, the message processing platform 102 may parse header information, metadata, or the like, available to the message processing platform 102 as a result of the first message being sent to the message processing platform 102 as an attachment rather than merely a forwarded message.

In some instances, the message processing platform 102 may analyze a display name associated with a sender of the first message. In doing so, the message processing platform 102 may identify a source entity associated with the display name, and may cross reference a database of known legitimate email addresses associated with the identified source entity. In doing so, the message processing platform 102 may identify whether or not the display name is verified. For example, the message processing platform 102 may identify a first source entity associated with the display name, and a person's name associated with the display name. In this example, however, the message processing platform 102 may determine that records associated with the first source entity do not show an email address associated with the identified person's name. Accordingly, the message processing platform 102 may determine that the first message is a phish.

Additionally or alternatively, the message processing platform 102 may parse header information, metadata, or the like, to identify whether or not the first message contains a known malicious link within the senders email address. For example, the message processing platform 102 may access a stored listing of known malicious links, and may compare the senders email address to the stored listing of known malicious links. Additionally or alternatively, the message processing platform 102 may compare header information to internet protocol signatures associated with known legitimate email addresses. For example, the message processing platform 102 may access or otherwise maintain a listing of source entities and corresponding legitimate internet protocol signatures for each of the source entities. In this example, if the message processing platform 102 determines that the header information does not match the legitimate internet protocol signature, the message processing platform 102 may identify that the first message is a phish. Additionally or alternatively, the message processing platform 102 may identify graphics, badges, or the like (e.g., may compare hash values) to identify whether the first message is a phish.

At step 209, the message processing platform 102 may identify an enterprise security system associated with the source entity identified at step 208 (e.g., a second source entity that a first source entity is pretending to be, the spoofed entity, or the like). In some instances, the message processing platform 102 may maintain a dynamic database that contains correlations between source entities and their corresponding enterprise security systems. In some instances, the message processing platform 102 may maintain a list of commonly spoofed entities (e.g., phishing messages associated with the particular entity have been identified more than a threshold value of times over a predetermined period of time, for example), and the dynamic database may contain correlations for these entities. In one or more instances, the message processing platform 102 may identify multiple enterprise security systems associated with a particular entity (e.g., each associated with different subgroups of the entity), and may maintain these additional correlations in the dynamic database as well. In one or more instances, the message processing platform 102 may only identify the corresponding enterprise security system if the first message is confirmed as a phishing message by the message processing platform 102 (e.g., a confidence level associated with the determination that the first message is a phishing message exceeds a predetermined confidence threshold). At step 209, it is assumed that the message processing platform 102 identified enterprise security system 104 as the corresponding enterprise security system.

Referring to FIG. 2C, at step 210, the message processing platform 102 may package the first message within a second message. For example, the message processing platform 102 may attach the first message to the second message. In other instances, the message processing platform 102 may capture header information, metadata, or the like associated with the first message, generate a text file containing the header information, metadata, or the like, and send a second message that includes the generated text file as an attachment. In other instances, the message processing platform 102 may create a new data object corresponding to the first message, and embed the data object into the second message. In doing so, the message processing platform 102 may mimic the process of dragging and dropping the first message into the second message as an attachment, and accordingly, may preserve the header information, metadata, or the like, that may be useful in phish identification.

At step 211, the message processing platform 102 may establish a connection with enterprise security system 104. For example, the message processing platform 102 may establish a second wireless data connection with the enterprise security system 104 to link the message processing platform 102 to the enterprise security system 104. In some instances, the message processing platform 102 may identify whether a connection is already established with the enterprise security system 104. If a connection is already established with the enterprise security system 104, the message processing platform 102 might not re-establish the connection. If a connection is not already established, the message processing platform 102 may establish the second wireless data connection as described herein.

At step 212, the message processing platform 102 may send the second message to the enterprise security system 104. In some instances, the message processing platform 102 may send the second message to the enterprise security system 104 via the communication interface 113 and while the second wireless data connection is established.

At step 213, the enterprise security system 104 may receive the second message, sent at step 212. For example, the enterprise security system 104 may receive the second message while the second wireless data connection is established.

At step 214, the enterprise security system 104 may confirm whether or not the first message is a phish. In some instances, the enterprise security system 104 may apply similar techniques to those described above with regard to the message processing platform 102. With regard to the enterprise security system 104, however, additional internal data may be accessible to the enterprise security system 104 that was not available to the message processing platform 102. Accordingly, the message processing platform 102 may effectively perform a first pass at classifying the first message as a phish, and the enterprise security system 104 may review the decision. At step 214, it is assumed that the enterprise security system 104 confirmed that the first message was in fact a phish.

Referring to FIG. 2D, at step 215, in response to confirming that the first message was a phishing message, the enterprise security system 104 may generate a customer engagement message. For example, the enterprise security system 104 may generate a message thanking the user of the client device 103 for participating in the effort to flag potential phishing messages. In some instances, rather than generating the customer engagement message at the enterprise security system 104, the mobile banking server 105 may generate the customer engagement message. In these instances, because the mobile banking server 105 has access to a transaction history of the user, the mobile banking server may include a reward in the customer engagement message, such as cash back on specific purchases (e.g., purchases that the customer frequently makes), discounts, or the like. In some instances, the enterprise security system 104 may generate the customer engagement message, and may then send the customer engagement message to the mobile banking server 105, which may enhance the customer engagement message with a reward as described above.

At step 216, the enterprise security system 104 may establish a connection with client device 103. In one or more instances, the enterprise security system 104 may establish a third wireless data connection with client device 103 to link the enterprise security system 104 to the client device 103. In one or more instances, the enterprise security system 104 may identify whether a connection is already established with the client device 103. If a connection is already established, the enterprise security system 104 might not reestablish the connection. If a connection is not already established, the enterprise security system 104 may establish the third wireless data connection as described herein.

At step 217, the enterprise security system 104 may send the customer engagement message to the client device 103. In some instances, the enterprise security system 104 may send the customer engagement message to the client device 103 while the third wireless data connection is established.

At step 218, the client device 103 may receive the customer engagement message sent at step 217. In one or more instances, the client device 103 may receive the customer engagement message from the enterprise security system 104 while the third wireless data connection is established.

At step 219, the client device 103 may display the customer engagement message, received at step 219. For example, the client device 103 may display a graphical user interface similar to graphical user interface 305, which is shown in FIG. 3. For example, the client device 103 may display an indication that the first message was correctly identified by the user as a phishing message, and may include a reward, such as a cash back reward at a particular establishment that the user frequents.

Referring to FIG. 2E, at step 220, the client device 103 may receive user input flagging a third message as potentially malicious. For example, the client device 103 may receive user input identifying the third message as a phish. In one or more instances, the client device 103 may receive the user input via one of the third party application, malicious message button, extension feature, or electronic messaging service described above at step 204. In some instances, actions performed at step 220 may be similar to those described above at step 204 with regard to the first message.

At step 221, the client device 103 may send the third message to the message processing platform 102. In some instances, in sending the third message, the client device 103 may send the third message as an attachment to another message. In one or more instances, the client device 103 may send the third message to the message processing platform 102 while the first wireless data connection is still established. Actions performed at step 221 may be similar to those described above with regard to step 206.

At step 222, message processing platform 102 may receive the third message sent at step 221 and/or the additional message that contains the third message as an attachment. In one or more instances, the message processing platform 102 may receive the third message via the communication interface 113 and while the first wireless data connection is still established. Actions performed at step 222 may be similar to those described above at step 207 with regard to the first message.

At step 223, the message processing platform 102 may parse the third message to identify whether or not the third message was correctly flagged as a phish. For example, the message processing platform 102 may apply one or more of: template comparison, natural language processing, artificial intelligence algorithms, machine learning algorithms, YARA rules, or the like, to identify whether or not the third message was correctly flagged as a phish. In parsing the first message, the message processing platform 102 may identify whether a first entity is pretending to be a second entity based on the patterns detected through the methods described above. In some instances, in parsing the third message, the message processing platform 102 may parse header information, metadata, or the like, available to the message processing platform 102 as a result of the third message being sent to the message processing platform 102 as an attachment rather than merely a forwarded message.

In some instances, the message processing platform 102 may analyze a display name associated with a sender of the third message. Additionally or alternatively, the message processing platform 102 may parse header information, metadata, or the like, to identify whether or not the third message contains a known malicious link within the senders email address. Additionally or alternatively, the message processing platform 102 may identify graphics, badges, or the like (e.g., may compare hash values) to identify whether the first message is a phish. In some instances, however, the message processing platform 102 may be unable to identify a source entity associated with the third message (e.g., the source entity being spoofed). Actions performed at step 224 may be similar to those described above at step 208, however, in contrast to step 208, at step 224 the message processing platform 102 may be unable to identify a source entity associated with the third message.

At step 224, the message processing platform 102 may determine that it is unable to identify an enterprise security system 104 associated with a source entity being spoofed in the third message. For example, the message processing platform 102 may identify that, because it was unable to identify a source entity at step 223, it is unable to access a correlation in the dynamic table between the source entity and an enterprise security system 104.

Figure 2F:
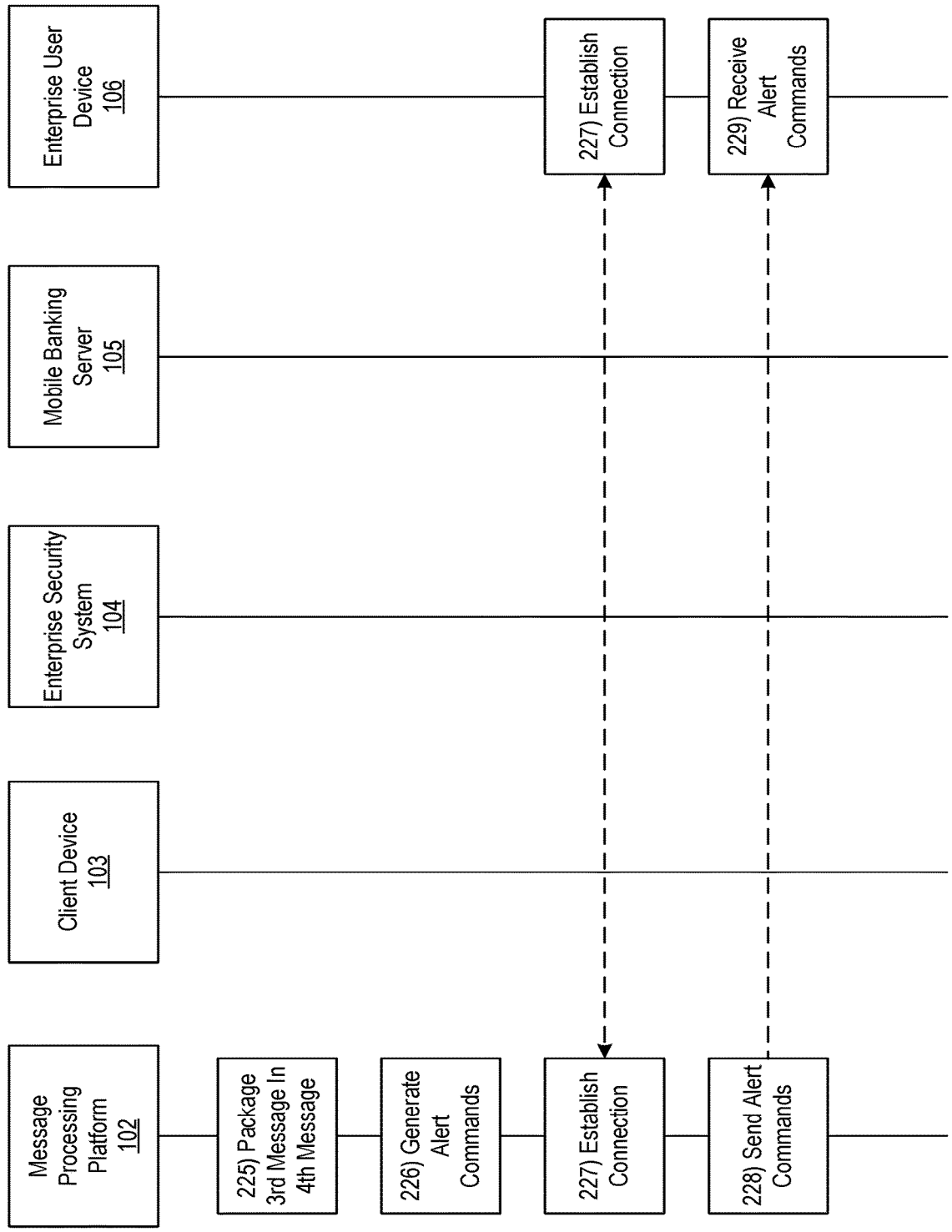

Referring to FIG. 2F, at step 225, the message processing platform 102 may package the third message in a fourth message. For example, the message processing platform 102 may attach the third message to the fourth message. In other instances, the message processing platform 102 may capture header information, metadata, or the like associated with the third message, generate a text file containing the header information, metadata, or the like, and send a fourth message that includes the generated text file as an attachment. In other instances, the message processing platform 102 may create a new data object corresponding to the third message, and embed the data object into the fourth message. In doing so, the message processing platform 102 may mimic the process of dragging and dropping the third message into the fourth message as an attachment, and accordingly, may preserve the header information, metadata, or the like, that may be useful in phish identification. Actions performed at step 224 may be similar to those described above with regard to step 210.

At step 226, the message processing platform 102 may generate one or more commands directing the enterprise user device 106 to display an alert indicating that a spoofed entity has not been identified and requesting user input. At step 227, the message processing platform 102 may establish a fourth wireless data connection with the enterprise user device 106. For example, the message processing platform 102 may establish a fourth wireless data connection with the enterprise user device 106 to link the message processing platform 102 to the enterprise user device 106. In some instances, the message processing platform 102 may identify whether or not a connection is already established with the enterprise user device 106. If a connection is already established, the message processing platform 102 might not re-establish the connection. If a connection is not already established, the message processing platform 102 may establish the fourth wireless data connection as described herein.

At step 228, the message processing platform 102 may send the one or more commands directing the enterprise user device 106 to display an alert indicating that a spoofed entity has not been identified and requesting user input to the enterprise user device 106. In one or more instances, the message processing platform 102 may send the one or more commands directing the enterprise user device 106 to display an alert indicating that a spoofed entity has not been identified and requesting user input via the communication interface 113 and while the fourth wireless data connection is established.

At step 229, the enterprise user device 106 may receive the one or more commands directing the enterprise user device 106 to display an alert indicating that a spoofed entity has not been identified and requesting user input. In one or more instances, the enterprise user device 106 may receive one or more commands directing the enterprise user device 106 to display an alert indicating that a spoofed entity has not been identified and requesting user input while the fourth wireless data connection is established.

Figure 2G:
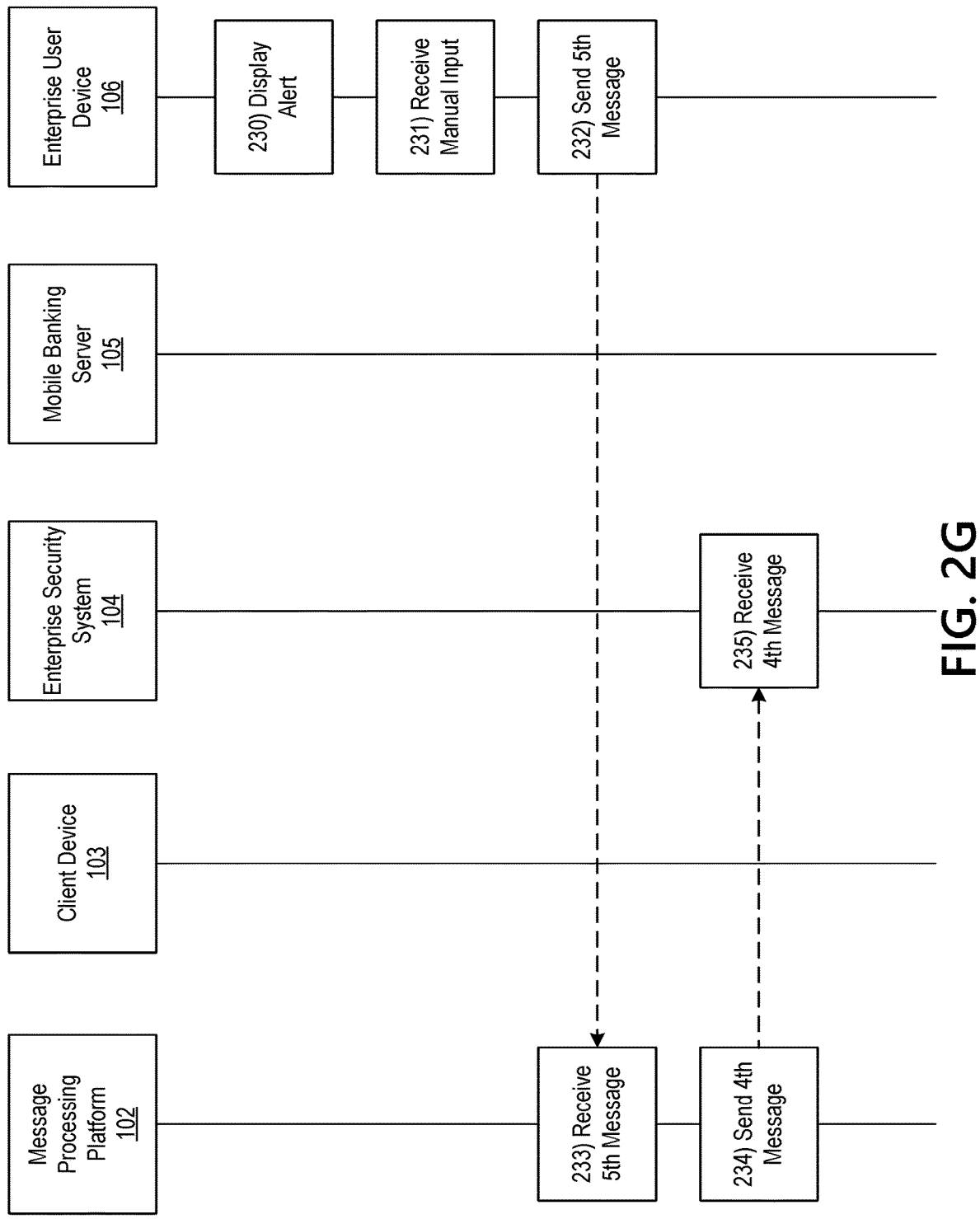

Referring to FIG. 2G, at step 230, the enterprise user device 106 may display an alert interface indicating that a spoofed entity cannot be identified for the third message, and prompting for user input (e.g., from an employee of the financial institution). In one or more instances, the enterprise user device 106 may display the alert interface in response to the one or more commands directing the enterprise user device 106 to display an alert indicating that a spoofed entity has not been identified and requesting user input. In some instances, in displaying the alert interface, the enterprise user device 106 may display a graphical user interface similar to graphical user interface 405, which is shown in FIG. 4. For example, the enterprise user device 106 may display an indication of the sender email address, and may request user input indicating a source entity believed to be spoofed (e.g., a user may see that "I" has been replaced with a "1" in the email address, and that "enterprise organization" is likely the spoofed source entity.

At step 231, the enterprise user device 106 may receive user input via the alert interface displayed at step 230. For example, the enterprise user device 106 may receive user input identifying a spoofed source entity (e.g., enterprise organization).

At step 232, the enterprise user device 106 may send a fifth message to the message processing platform 102 that indicates the identified source entity from step 231. For example, the enterprise user device 106 may send the fifth message to the message processing platform 102 while the fourth wireless data connection is established.

At step 233, the message processing platform 102 may receive the fifth message, sent at step 232. In one or more instances, the message processing platform 102 may receive the fifth message via the communication interface 113 and while the fourth wireless data connection is established.

At step 234, in response to receiving an indication of the identified source entity (e.g., the fifth message) at step 233, the message processing platform 102 may identify an enterprise security system associated with the identified source entity (e.g., a second source entity that a first source entity is pretending to be, the spoofed entity, or the like). In some instances, the message processing platform 102 may maintain a dynamic database that contains correlations between source entities and their corresponding enterprise security systems. In some instances, the message processing platform 102 may maintain a list of commonly spoofed entities (e.g., phishing messages associated with the particular entity have been identified more than a threshold value of times over a predetermined period of time, for example), and the dynamic database may contain correlations for these entities. In one or more instances, the message processing platform 102 may identify multiple enterprise security systems associated with a particular entity (e.g., each associated with different subgroups of the entity), and may maintain these additional correlations in the dynamic database as well. In one or more instances, the message processing platform 102 may only identify the corresponding enterprise security system if the first message is confirmed as a phishing message by the message processing platform 102 (e.g., a confidence level associated with the determination that the first message is a phishing message exceeds a predetermined confidence threshold). At step 234, it is assumed that the message processing platform 102 identified enterprise security system 104 as the corresponding enterprise security system.

After identifying the enterprise security system 104 as the corresponding enterprise security system, the message processing platform 102 may send the fourth message to the enterprise security system 104. For example, the enterprise security system 104 may send the fourth message via the communication interface and while the second wireless data connection is established. Actions performed at step 234 may be similar to those described above at step 209 and 212.

At step 235, the enterprise security system 104 may receive the fourth message, sent at step 234. In one or more instances, the enterprise security system 104 may receive the fourth message while the second wireless data connection is established. Actions performed at step 235 may be similar to those described above at step 213.

Figure 2H:
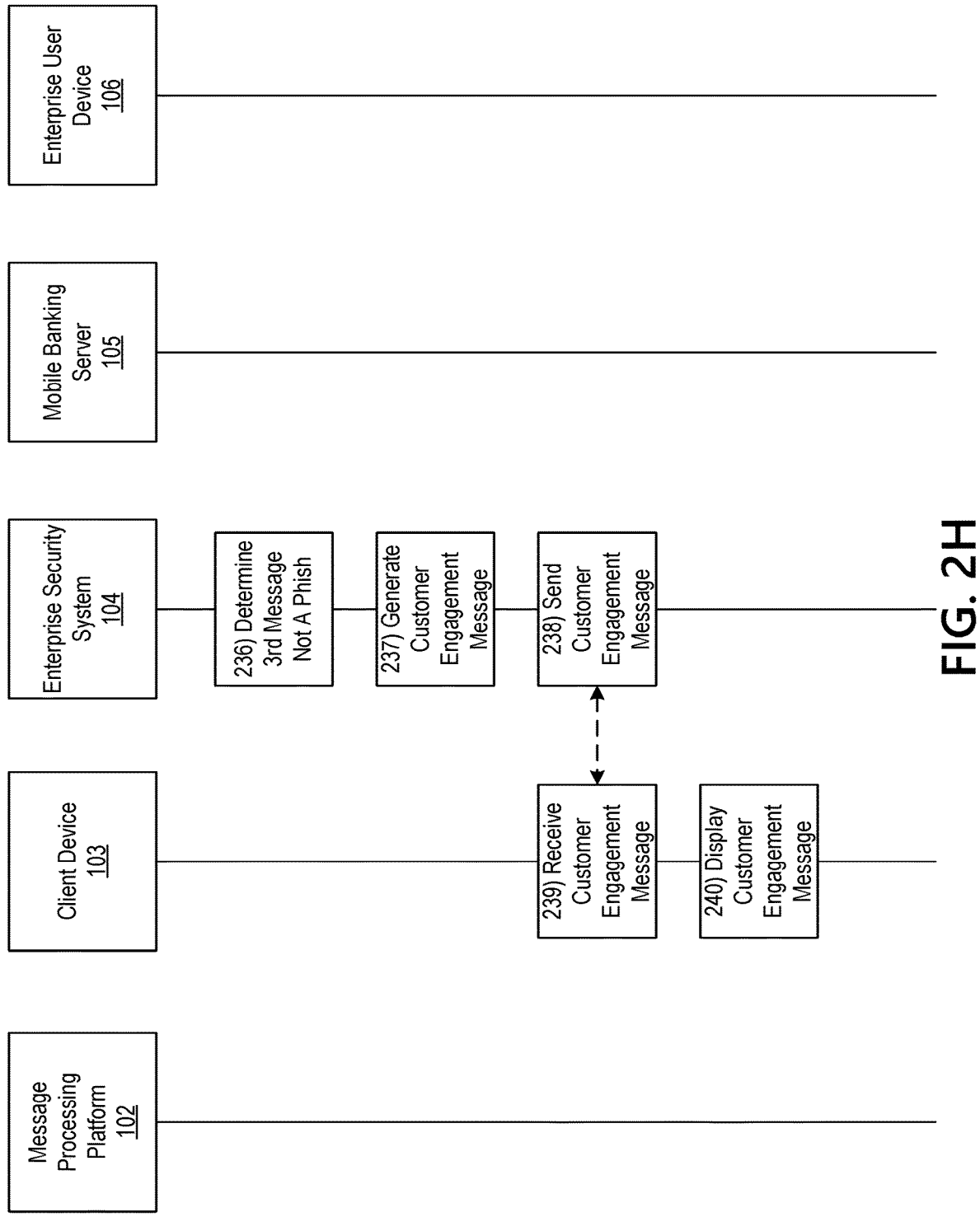

Referring to FIG. 2H, at step 236, the enterprise security system 104 may confirm whether or not the third message is a phish. In some instances, the enterprise security system 104 may apply similar techniques to those described above with regard to the message processing platform 102. With regard to the enterprise security system 104, however, additional internal data may be accessible to the enterprise security system 104 that was not available to the message processing platform 102. Accordingly, the message processing platform 102 may effectively perform a first pass at classifying the third message as a phish, and the enterprise security system 104 may review the decision. Actions performed at step 236 may be similar to those described at step 214. At step 236, however, it is assumed that the enterprise security system 104 determined that the third message was not a phish.

At step 237, the enterprise security system 104 may generate a customer engagement message. For example, in response to determining that the third message is not a phishing message, the enterprise security system 104 may generate a customer engagement message. For example, the enterprise security system 104 may generate a message thanking the user of the client device 103 for participating in the effort to flag potential phishing messages. In some instances, the enterprise security system 104 may generate a message indicating that the user was incorrect in classifying a message as a phish. In instances where the enterprise security system 104 determines that a user was incorrect, a reward might not be offered to the user as described above at step 215. Actions performed at step 237 may be similar to those described above at step 215.

At step 238, the enterprise security system 104 may send the customer engagement message, generated at step 237, to the client device 103. For example, the enterprise security system 104 may send the customer engagement message to the client device 103 while the third wireless data connection is established. Actions performed at step 238 may be similar to those described above at step 217.

At step 239, the client device 103 may receive the customer engagement message sent at step 238. In one or more instances, the client device 103 may receive the customer engagement message while the third wireless data connection is established. Actions performed at step 239 may be similar to those described above at step 218.

At step 240, the client device 103 may display the customer engagement message received at step 239. In displaying the customer engagement message, the client device 103 may display a graphical user interface similar to graphical user interface 505, which is shown in FIG. 5. For example, the client device 103 may display a message indicating that the user identified a legitimate message and not a phish. Actions performed at step 240 may be similar to those described above at step 219.

Figure 6:
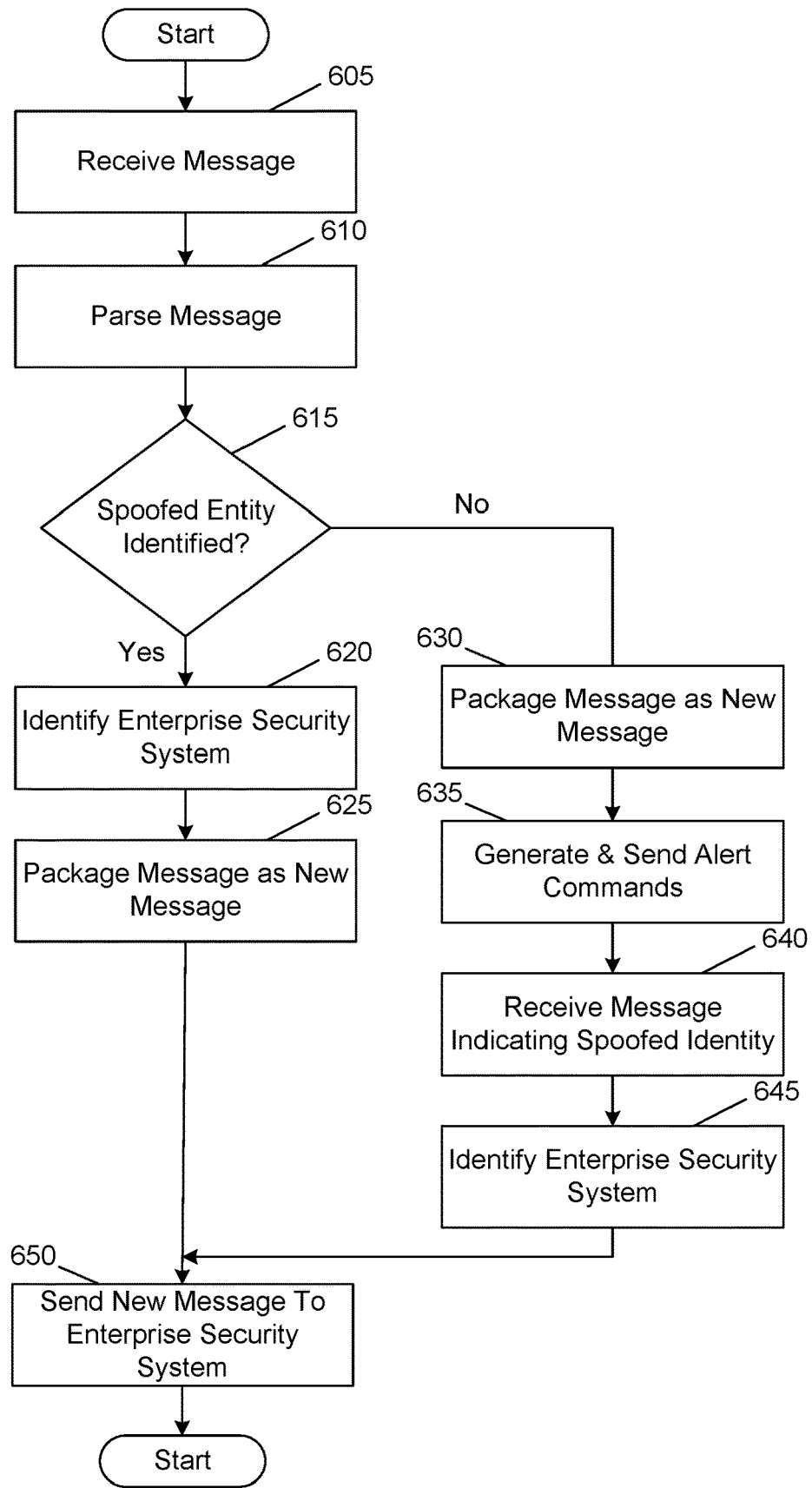
FIG. 6 depicts an illustrative method for implementing a message processing platform for enhanced phishing message detection in accordance with one or more example embodiments.

FIG. 6 depicts an illustrative method for implementing a message processing platform for enhanced phishing message detection in accordance with one or more example embodiments. Referring to FIG. 6, at step 605, a computing platform having at least one processor, a communication interface, and memory may receive a message. At step 610, the computing platform may parse the message to identify whether or not the message is a phish. At step 615, the computing platform may determine whether a spoofed entity was identified. If a spoofed entity was identified, the computing platform may proceed to step 620. If a spoofed entity was not identified, the computing platform may proceed to step 630.

At step 620, the computing platform may identify an enterprise security system associated with the identified spoofed entity. At step 625, the computing platform may package the message as a new message.

Alternatively, if a spoofed entity was not identified at step 615, then at step 630, the computing platform may package the message as a new message. At step 635, the computing platform may generate and send one or more commands directing an enterprise user device to display an alert that a spoofed entity was not identified and requesting user input. At step 640, in response to the one or more commands directing the enterprise user device to display an alert that a spoofed entity was not identified and requesting user input, the computing platform may receive a message indicating the spoofed entity. At step 645, the computing platform may identify the enterprise security system. At step 650, the computing platform may send the new message to the identified enterprise security system.

One or more aspects of the disclosure may be embodied in computer-usable data or computer-executable instructions, such as in one or more program modules, executed by one or more computers or other devices to perform the operations described herein. Generally, program modules include routines, programs, objects, components, data structures, and the like that perform particular tasks or implement particular abstract data types when executed by one or more processors in a computer or other data processing device. The computer-executable instructions may be stored as computer-readable instructions on a computer-readable medium such as a hard disk, optical disk, removable storage media, solid-state memory, RAM, and the like. The functionality of the program modules may be combined or distributed as desired in various embodiments. In addition, the functionality may be embodied in whole or in part in firmware or hardware equivalents, such as integrated circuits, application-specific integrated circuits (ASICs), field programmable gate arrays (FPGA), and the like. Particular data structures may be used to more effectively implement one or more aspects of the disclosure, and such data structures are contemplated to be within the scope of computer executable instructions and computer-usable data described herein.

Various aspects described herein may be embodied as a method, an apparatus, or as one or more computer-readable media storing computer-executable instructions. Accordingly, those aspects may take the form of an entirely hardware embodiment, an entirely software embodiment, an entirely firmware embodiment, or an embodiment combining software, hardware, and firmware aspects in any combination. In addition, various signals representing data or events as described herein may be transferred between a source and a destination in the form of light or electromagnetic waves traveling through signal-conducting media such as metal wires, optical fibers, or wireless transmission media (e.g., air or space). In general, the one or more computer-readable media may be and/or include one or more non-transitory computer-readable media.

As described herein, the various methods and acts may be operative across one or more computing servers and one or more networks. The functionality may be distributed in any manner, or may be located in a single computing device (e.g., a server, a client computer, and the like). For example, in alternative embodiments, one or more of the computing platforms discussed above may be combined into a single computing platform, and the various functions of each computing platform may be performed by the single computing platform. In such arrangements, any and/or all of the above-discussed communications between computing platforms may correspond to data being accessed, moved, modified, updated, and/or otherwise used by the single computing platform. Additionally or alternatively, one or more of the computing platforms discussed above may be implemented in one or more virtual machines that are provided by one or more physical computing devices. In such arrangements, the various functions of each computing platform may be performed by the one or more virtual machines, and any and/or all of the above-discussed communications between computing platforms may correspond to data being accessed, moved, modified, updated, and/or otherwise used by the one or more virtual machines.

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one or more of the steps depicted in the illustrative figures may be performed in other than the recited order, and one or more depicted steps may be optional in accordance with aspects of the disclosure.

What is claimed is:

1. A computing platform for analyzing potentially malicious messages, including at least phishing messages, received on a computing device of a customer of a financial institution associated with the computing platform, the computing platform comprising:
   at least one processor;
   a communication interface communicatively coupled to the at least one processor; and memory storing computer-readable instructions that, when executed by the at least one processor, cause the computing platform to:
  receive, from a mobile banking application of the financial institution executing on the customer computing device, a first message from a first source entity, wherein the first message was flagged by the customer as potentially malicious through the customer's selection of a malicious message button displayed in an interface generated by the mobile banking application, and wherein the first message includes content from the first source entity pretending to be a second source entity different than the first source entity, wherein the first message is received by the customer in a separate electronic message service, and wherein selection of the malicious message button causes a third party application that is integrated into the mobile banking application to launch and generate a second message to the computing platform including the first message as an attachment;
  parse, using one or more machine learning algorithms, the first message to identify whether the first message was correctly flagged by the customer as malicious, wherein the parsing comprises an analysis of header information, metadata, and display name, and includes identifying the second source entity;
  identify an enterprise security system associated with the second source entity, wherein the identifying is based on a correlation table that stores correlations between enterprise organizations including at least the second source entity and its associated enterprise security systems;
  generate a third message, wherein the third message:
    includes the first message as an attachment, wherein the attachment includes all metadata of the first message; and
    indicates that the first message was flagged as potentially malicious; and
  send, to the enterprise security system, the third message, wherein the enterprise security system is configured to confirm, using the metadata, that the first message is malicious.

2. The computing platform of claim 1, wherein including the first message as an attachment to the third message comprises:
  generating a data object containing data from the first message, and
  embedding the data object in the third message.

3. The computing platform of claim 1, wherein the memory stores additional computer-readable instructions that, when executed by the at least one processor, further cause the computing platform to:
  based on confirming that the first message is malicious, generate a client engagement message indicating a reward, wherein generating the client engagement message comprises:
    accessing a transaction history of a user of the customer computing device to identify frequent transactions made by the user, and
    generating, for the user, a cash back reward for a particular type of transaction corresponding to the frequent transactions; and
  send, to the customer computing device, the client engagement message, wherein the first message was flagged as potentially malicious at the customer computing device.

4. The computing platform of claim 3, wherein the reward is identified based on transaction data associated with an account through which the first message was flagged as potentially malicious within the mobile banking application.

5. The computing platform of claim 1, wherein the memory stores additional computer-readable instructions that, when executed by the at least one processor, further cause the computing platform to:
  maintain the correlation table comprising correlations between the enterprise organizations and the associated enterprise security systems.

6. The computing platform of claim 1, wherein the mobile banking application is configured to communicate with a mail application through an application programming interface.

7. The computing platform of claim 1, wherein including the first message as an attachment to the third message comprises:
  extracting header information from the first message;
  generating a text file that includes the header information from the first message; and
  attaching, to the third message, the text file that includes the header information from the first message.

8. The computing platform of claim 1, wherein the memory stores additional computer-readable instructions that, when executed by the at least one processor, further cause the computing platform to:
  receive a fourth message from the first source entity, wherein the fourth message was flagged as potentially malicious through selection of the malicious message button in the mobile banking application, and wherein the fourth message includes content from the first source entity pretending to be the second source entity;
  parse, using one or more machine learning algorithms, the fourth message, wherein parsing the fourth message does not result in identification of the second source entity;
  generate one or more commands directing an enterprise user device to display a user interface requesting user input identifying the second source entity;
  receive, in response to the one or more commands directing the enterprise user device to display a user interface requesting user input identifying the second source entity, a message identifying the second source entity;
  generate a fifth message, wherein the fifth message:
    includes the fourth message as an attachment, and
    indicates that the fourth message was flagged as potentially malicious; and
  send, to the enterprise security system, the fifth message.

9. The computing platform of claim 1, wherein parsing the first message to identify the second source entity further comprises parsing, using one or more of: template comparison or artificial intelligence algorithms to identify the second source entity.

10. A method comprising:
  at a computing platform for analyzing potentially malicious messages, including at least phishing messages, received on a computing device of a customer of a financial institution associated with the computing platform, the computing platform comprising at least one processor, a communication interface, and memory:
    receiving, from a mobile banking application of the financial institution executing on the customer computing device, a first message from a first source entity, wherein the first message was flagged by the customer as potentially malicious through the customer's selection of a malicious message button displayed in an interface generated by the mobile banking application, and wherein the first message includes content from the first source entity pretending to be a second source entity different than the first source entity, wherein the first message is received by the customer in a separate electronic message service, and wherein selection of the malicious message button causes a third party application that is integrated into the mobile banking application to launch and generate a second message to the computing platform including the first message as an attachment;

parsing, using one or more machine learning algorithms, the first message to identify whether the first message was correctly flagged by the customer as malicious, wherein the parsing comprises an analysis of header information, metadata, and display name, and includes identifying the second source entity;

identifying an enterprise security system associated with the second source entity, wherein the identifying is based on a correlation table that stores correlations between enterprise organizations including at least the second source entity and its associated enterprise security systems;

generating a third message, wherein the third message:
includes the first message as an attachment, wherein the attachment includes all metadata of the first message; and
indicates that the first message was flagged as potentially malicious; and sending, to the enterprise security system, the third message, wherein the enterprise security system is configured to confirm, using the metadata, that the first message is malicious.

11. The method of claim 10, wherein including the first message as an attachment to the third message comprises:
generating a data object containing data from the first message, and
embedding the data object in the third message.

12. The method of claim 10, further comprising:
based on confirming that the first message is malicious, generating a client engagement message indicating a reward, wherein generating the client engagement message comprises:
accessing a transaction history of a user of the customer computing device to identify frequent transactions made by the user, and
generating, for the user, a cash back reward for a particular type of transaction corresponding to the frequent transactions; and
sending, to the customer computing device, the client engagement message, wherein the first message was flagged as potentially malicious at the customer computing device.

13. The method of claim 12, wherein the reward is identified based on transaction data associated with an account through which the first message was flagged as potentially malicious within the mobile banking application.

14. The method of claim 10, further comprising:
maintaining the correlation table comprising correlations between the enterprise organizations and the associated enterprise security systems.

15. The method of claim 10, wherein the mobile banking application is configured to communicate with a mail application through an application programming interface.

16. The method of claim 10, wherein including the first message as an attachment to the third message comprises:

extracting header information from the first message;
generating a text file that includes the header information from the first message; and
attaching, to the third message, the text file that includes the header information from the first message.

17. The method of claim 10, further comprising:
receiving a fourth message from the first source entity, wherein the fourth message was flagged as potentially malicious through selection of the malicious message button in the mobile banking application, and wherein the fourth message includes content from the first source entity pretending to be the second source entity;
parsing, using one or more machine learning algorithms, the fourth message, wherein parsing the fourth message does not result in identification of the second source entity;
generating one or more commands directing an enterprise user device to display a user interface requesting user input identifying the second source entity;
receiving, in response to the one or more commands directing the enterprise user device to display a user interface requesting user input identifying the second source entity, a message identifying the second source entity;
generating a fifth message, wherein the fifth message:
includes the fourth message as an attachment, and
indicates that the fourth message was flagged as potentially malicious; and
sending, to the enterprise security system, the fifth message.

18. The method of claim 10, wherein parsing the first message to identify the second source entity further comprises parsing, using one or more of: template comparison or artificial intelligence algorithms to identify the second source entity.

19. One or more non-transitory computer-readable media storing instructions that, when executed by a computing platform for analyzing potentially malicious messages, including at least phishing messages, received on a computing device of a customer of a financial institution associated with the computing platform, the computing platform comprising at least one processor, a communication interface, and memory, cause the computing platform to:
receive, from a mobile banking application of the financial institution executing on the customer computing device, a first message from a first source entity, wherein the first message was flagged by the customer as potentially malicious through customer's selection of a malicious message button displayed in an interface generated by the mobile banking application, and wherein the first message includes content from the first source entity pretending to be a second source entity different than the first source entity, wherein the first message is received by the customer in a separate electronic message service, and wherein selection of the malicious message button causes a third party application that is integrated into the mobile banking application to launch and generate a second message to the computing platform including the first message as an attachment;
parse, using one or more machine learning algorithms, the first message to identify whether the first message was correctly flagged by the customer as malicious, wherein the parsing comprises an analysis of header information, metadata, and display name, and includes identifying the second source entity;

identify an enterprise security system associated with the second source entity, wherein the identifying is based on a correlation table that stores correlations between enterprise organizations including at least the second source entity and its associated enterprise security systems;

generate a third message, wherein the third message:
- includes the first message as an attachment, wherein the attachment includes all metadata of the first message; and
- indicates that the first message was flagged as potentially malicious; and send, to the enterprise security system, the third message, wherein the enterprise security system is configured to confirm, using the metadata, that the first message is malicious.

20. The one or more non-transitory computer-readable media of claim 19, wherein including the first message as an attachment to the third message comprises:

generating a data object containing data from the first message, and embedding the data object in the third message.

\* \* \* \* \*